(12) United States Patent
Cruz et al.

(10) Patent No.: US 7,640,016 B2
(45) Date of Patent: Dec. 29, 2009

(54) AIR-TO-GROUND CELLULAR NETWORK FOR DECK-TO-DECK CALL COVERAGE

(75) Inventors: Joseph M. Cruz, Naperville, IL (US); Ivica Kostanic, Palm Bay, FL (US); Harold Grant Saroka, Ashburn, VA (US); Anand K. Chari, Bartlett, IL (US)

(73) Assignee: AirCell, LLC, Louisville, CO (US)

( * ) Notice: Subject to any disclaimer, the term of this patent is extended or adjusted under 35 U.S.C. 154(b) by 519 days.

(21) Appl. No.: 11/240,975

(22) Filed: Sep. 30, 2005

(65) Prior Publication Data
US 2006/0040660 A1 Feb. 23, 2006

(51) Int. Cl.
*H04W 4/00* (2009.01)
*G05D 1/06* (2006.01)

(52) U.S. Cl. .......................................... 455/431; 701/8
(58) Field of Classification Search ................. 455/431; 701/8
See application file for complete search history.

(56) References Cited

U.S. PATENT DOCUMENTS

| | | | |
|---|---|---|---|
| 3,659,085 A * | 4/1972 | Potter et al. ............... 701/207 |
| 4,115,777 A * | 9/1978 | Taylor ...................... 342/411 |
| 5,438,610 A | 8/1995 | Bhagat et al. |
| 5,519,761 A | 5/1996 | Gilhousen |
| 5,590,395 A | 12/1996 | Diekelman |
| 5,832,380 A * | 11/1998 | Ray et al. .................. 455/431 |
| 5,848,359 A * | 12/1998 | Furtaw ...................... 455/447 |
| 5,926,759 A * | 7/1999 | Severwright ............... 455/431 |
| 6,002,944 A | 12/1999 | Beyda |
| 6,055,425 A | 4/2000 | Sinivaara |
| 6,314,286 B1 | 11/2001 | Zicker |
| 6,430,412 B1 | 8/2002 | Hogg et al. |
| 6,477,152 B1 | 11/2002 | Hiett |
| 6,754,489 B1 | 6/2004 | Roux |
| 6,889,042 B2 | 5/2005 | Rousseau et al. |

\* cited by examiner

*Primary Examiner*—Vincent P Harper
*Assistant Examiner*—Marivelisse Santiago-Cordero
(74) *Attorney, Agent, or Firm*—Patton Boggs LLP

(57) ABSTRACT

The air-to-ground cellular network for deck-to-deck call coverage provides call coverage to customers who are located in aircraft that are flying within the arrival/departure airspace of an airport by trifurcating the spatial coverage regions or volumes of space to solve the problems of inter-network interference while yielding air-to-ground cellular network coverage at any altitude. Three types of cells are considered: an Outer Cell, an Inner Cell and an Airport Cell. The Outer Cell is a macro cell covering a large volume of space and is one of many cells in the composite air-to-ground cellular network. The Inner Cell is created within an Outer Cell and has at its center an airport. The Airport Cell is a part of the Terrestrial Cellular Network (TCN), created by the present terrestrial cellular operators or service providers.

20 Claims, 15 Drawing Sheets

Inner Cell forward link rate for cell site ring of 9 miles

Reverse link TX power, 153.6 kbps, 50% loading, cell ring of 9 miles

AIR-TO-GROUND CELLULAR NETWORK FOR DECK-TO-DECK CALL COVERAGE

CROSS-REFERENCE TO RELATED APPLICATIONS

This application is related to U.S. patent application Ser. No. 10/756,491 filed Jan. 13, 2004 and titled "Overlapping Spectrum Cellular Communication Networks," which is a continuation-in-part of U.S. patent application Ser. No. 09/686,923 filed Oct. 11, 2000 titled "Aircraft-Based Network for Wireless Subscriber Stations,"which is a continuation-in-part of U.S. Pat. No. 6,408,180 filed Aug. 24, 1999 and titled "Ubiquitous Subscriber Station," which is continuation-in-part of U.S. Pat. No. 6,108,539, filed Oct. 22, 1997 and titled "Non-Terrestrial Subscriber Station," which is a continuation-in-part of U.S. Pat. No. 5,878,346, filed Jul. 2, 1996 and titled "Multi-Dimensional Mobile Cellular Communication Network," which is a continuation-in-part of U.S. Pat. No. 5,444,762, filed Mar. 8, 1993 and tided "Method and Apparatus for Reducing Interference Among Cellular Telephone Signals," and U.S. Pat. No. 5,557,656, filed Mar. 6, 1992 and tided "Mobile Communications."

FIELD OF THE INVENTION

This invention relates to air-to-ground cellular communications and, in particular, to an air-to-ground network that provides call coverage to customers who are located in aircraft that are flying within the arrival/departure airspace of an airport.

PROBLEM

It is a problem in the field of air-to-ground cellular communications to provide cellular communications services not only to en route aircraft, those that are flying at altitudes of 10,000 feet and higher, but also to aircraft that are flying within the arrival/departure airspace of an airport. As an aircraft transitions between the en route flight altitude (flight deck) and the airport (ground deck), existing air-to-ground cellular communications systems are unable to provide cellular communications to the customers who are located in the aircraft.

The en route aircraft are provided wireless telecommunication services via cells designed to provide coverage above 10,000 feet. These cells are very large in their coverage territory (or volume of space) and do not have the signal service area to cover airport regions. Their antenna patterns are designed for higher altitudes and greater distances which often translate into specialized antenna patterns well known in the art. For these en route cells, line-of-sight restrictions often prevent any signal from being extent at a given airport (e.g. no service is available). In addition, modern cellular architectures such as CDMA (CDMA2000) offer unique challenges to offer airport region coverage. These challenges involve self-interference between small local coverage cells and the larger en route cells. And, if the spectral band assignment is shared by 2 or more cellular operators (service providers), the interference problem now becomes one of not just self or intra-network interference but involves inter-network interference between multiple systems.

There is a need for an air-to-ground cellular communication system that enables personal cell phone usage that is available at any aircraft operating altitude. In addition, it is desirable to have this system be spectrally efficient so that at least two wireless networks can share the same spectral band assignment. Finally, it is desirable to have these multiple networks offer modern cellular service coverage at any altitude, including when aircraft are landing and taking off. This technological advance must offer seamless cellular coverage for aircraft transitioning from any altitude to any another altitude. This means that the communications systems must be able to handoff a given call or data connection from one cell to the next as an aircraft transitions from one altitude to another while traversing a relatively large distance over the ground. The technology to achieve such a benefit is presently not available.

SOLUTION

The above-described problems are solved and a technical advance achieved by the present air-to-ground cellular network for deck-to-deck call coverage, termed "deck-to-deck cellular system" herein, that provides call coverage to customers who are located in aircraft that are flying within the arrival/departure airspace of an airport and as an aircraft transitions between the en route flight altitude (flight deck) and the airport (ground deck), which transition is termed "deck-to-deck" herein.

The deck-to-deck cellular system accomplishes this result by trifurcating the air-to-ground cellular network spatial coverage regions (or volumes of space) to solve the problems of inter-network interference while yielding air-to-ground cellular network coverage at any altitude. While trifurcating the spatial volume is the preferred embodiment disclosed herein, the spatial regions could be divided into smaller regions in a like manner as taught in the trifurcated embodiment. The spatial coverage regions are no longer two-dimensional, as they are in terrestrial cellular communications. Since aircraft operate at altitudes that vary from ground level to 40,000+ feet Above Ground Level, the required cellular coverage region now includes a vertical dimension, making the problem more complex since three-dimensional volumetric coverage regions are needed. These three-dimensional volumetric coverage regions generally map where the majority of aircraft flight operations occur, such as commercial airports and heavy use business airports. In this design, three cell types are considered (although a finer cellular granularity is certainly achievable and is not limited by the discussion herein): an Outer Cell, an Inner Cell, and an Airport Cell.

The Outer Cell is a macro cell covering a large volume of space and is one of many cells in the composite air-to-ground cellular network. To minimize interference, the Outer Cell is not concentric with other cells offering near airport cellular air-to-ground service. To provide seamless coverage above 10,000 feet Above Ground Level (AGL) for the Continental United States (CONUS), approximately 150 cell sites are needed. The Outer Cell is part of the Air-To-Ground (ATG) wireless cellular network.

The Inner Cell is created within an Outer Cell (or overlapping Outer Cells) and has an airport at its center. The Inner Cell provides cellular coverage to aircraft that are transitioning from an en-route altitude through an arrival or departure corridor to eventual handoff to the terrestrial cellular network. The antenna patterns of the Inner Cell can be omni-directional or sectored but, in both cases, have elevation patterns that map to the arrival or departure glide slope corridors. The Inner Cell (or Cells) is part of the terrestrially located air-to-ground cellular network. The Inner Cell needs to solve two basic problems: offer high quality communications capability to the serving aircraft and avoid self-interference to Outer Cells, other Inner Cells and other cellular networks sharing the spectrum (inter-network interference). The Inner Cell is formed as using either omni-directional or sector antennas that are installed in a "ring" around the airport and are typically located in planar doughnut configuration that is formed by the radii 8 miles and 10 miles from the airport. This locus is generally technology agnostic and is determined by the glide slope, interference issues and coverage requirements.

The Airport Cell, in the preferred embodiment, is a part of the Terrestrial Cellular Network (TCN), created by the present terrestrial cellular service providers (also termed "carriers' herein). The Inner Cell, which is part of the terrestrial air-to-ground cellular network, hands-off calls to the Airport Cell, which is part of the Terrestrial Cellular Network as the aircraft transitions between the coverage regions of both networks. The Airport Cell in another embodiment could be part of the air-to-ground network with a very small coverage region. This alternative embodiment, since it is part of the air-to-ground network, while technically feasible, does create added complexity in terms of the interference environment.

In general, the deck-to-deck solution involves integrating combinations of antenna patterns, cell site locations and transmit power to enable deck-to-deck cellular service and minimize interference, intra- and inter-network. Deck-to-deck coverage is realized through the transitional combination of the Outer Cell, the Inner Cell and the Airport Cell where the Inner Cell has: (1) limited transmit power towards the horizon (by a combination of uptilted antennas and/or reduced transmitter power), and (2) observe minimum site spacing requirements in a pre-defined geometry as described below.

DETAILED DESCRIPTION

Figure 1:
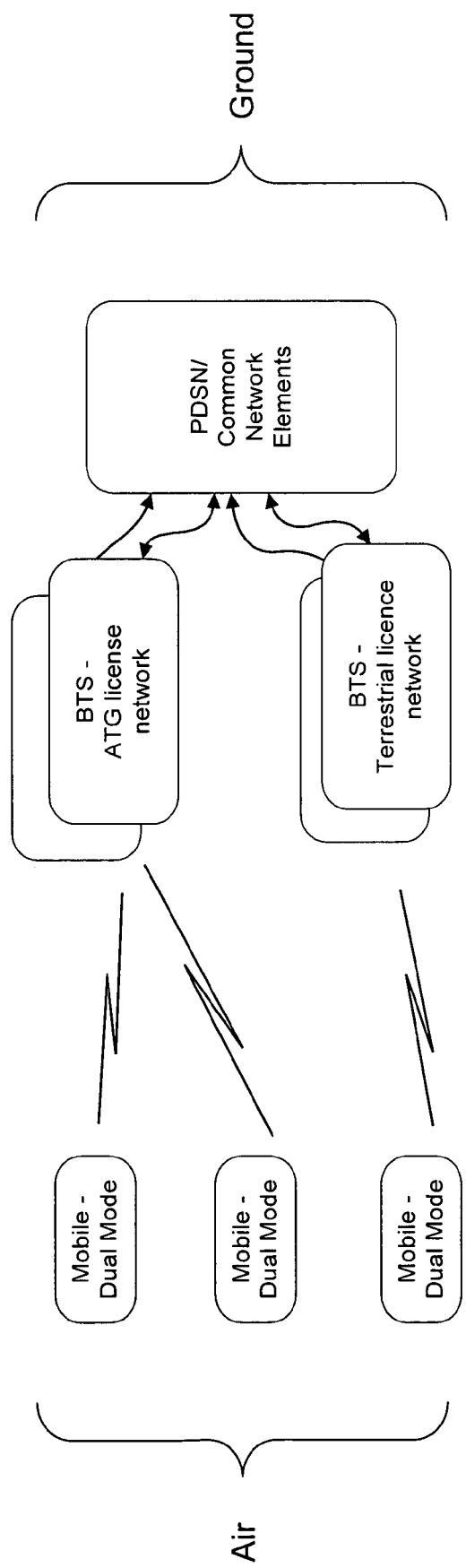
FIG. 1 illustrates, in block diagram form, the architecture of the deck-to-deck cellular system.

Cellular wireless communication systems provide the service of connecting wireless communication customers, each having a wireless subscriber device, to both land-based customers who are served by the common carrier public telephone network as well as other wireless communication customers. In such a system, if the customer originated traffic is circuit switched, all incoming and outgoing calls are routed through Mobile Telephone Switching Offices (MTSO), each of which is connected to a plurality of cell sites or Base Station Subsystems (BSS's) which communicate with wireless subscriber devices located in the area covered by the cell sites. The cell sites, each of which is located in one cell area of a larger service region, serve the wireless subscriber devices. Each cell site in the service region is connected by a group of communication links to the Mobile Telephone Switching Office. Each cell site contains a group of radio transmitters and receivers with each transmitter-receiver pair being connected to one communication link.

The terms "cell site" and "cell" are sometimes loosely used in the literature, and the term "cell site" generally denotes the locus at which the transmitter and receiver apparatus is located, while the term "cell" generally denotes the region of space which is served by a particular transmitter-receiver pair which is installed at a cell site. The particular technology used to implement the communications between wireless subscriber devices and the transmitter-receiver pairs as well as the nature of the data transferred there between, be it voice, video, telemetry, computer data, and the like, are not limitations to the system which is described herein, since a novel system concept is disclosed, versus a specific technologically limited implementation of an existing system concept. Therefore, the term "cellular" as it is used herein denotes a communication system which operates on the basis of dividing space into a plurality of volumetric sections or cells, and managing communications between wireless subscriber devices located in the cells and the associated transmitter-receiver pairs located at the cell site for each of these cells.

Terrestrial Air-to-Ground Networks

Terrestrial air-to-ground cellular networks are generally designed using many of the same architectural features as terrestrial cellular communications networks. A network of ground stations is designed to provide overlapping coverage, so that the overall network is capable of providing service throughout the network, utilizing handovers as an aircraft moves between the coverage areas of adjacent cells. Ground station antenna systems may be designed using directional antennas, each equipped with a transceiver or set of transceivers, in order to provide distinct coverage cells, much as similar arrangements are utilized in terrestrial cellular communication systems. Directional antenna, as the term is used herein, does not imply that a signal is transmitted or received from a particular direction, but that the antenna has a non-isotropic radiation pattern.

Inter-System Interference

In typical terrestrial cellular systems, where carriers effectively "share" the same spectrum with minimal geographic separation, carriers must evaluate and manage inter-system interference created between one carrier's base stations and the other carrier's mobile terminals. In practice, this type of interference has existed and been managed for many years. In cross duplex systems, the interference potential exists between mobile terminals ("air-air") and between base stations ("base-base"). Such potential interference can be managed with no greater effort than has been required between geographically separated carriers with terrestrial cellular systems.

Air-Air Interference. The typical air traffic minimum aircraft separation requirements (1000 feet vertical separation and 5 nautical mile horizontal separation) assure that there are only minimal cross system impacts between aircraft—the combination of horizontal spacing, the shielding created by the body of the lower altitude aircraft and the fact that aircraft (mobiles) maintain the minimum required transmit power level in an typical broadband system provides adequate signal isolation between the aircraft operating at worst case separation distances.

Base-Base Interference. Isolation between one carrier's base stations and the other carrier's mobile terminals is ensured by nearby base sites controlling interference. For cross-country sites (i.e., those serving en-route aircraft), the spacing between cells of a carrier is so great that carriers can easily avoid interfering with each other with minimal coordination (considerably less than what is typically required between adjoining terrestrial cellular systems, for instance). In the vicinity of major airports, there is a greater density of aircraft, and it is anticipated that a carrier may need multiple sites to provide the required capacity. In order to allow carriers to provide comparable levels of service within the vicinity of airports while precluding high levels of base-base interference, limiting the transmit power towards the horizon (implemented by a combination of up-tilted antennas and/or reduced transmitter power) is desirable. Further, an intra-system site spacing requirement assures that multiple entrants will not be precluded from providing service in the vicinity of the airport due to the first carrier's site layout.

Multiple System Isolation Mechanisms

In the co-pending U.S. patent application Ser. No. 10/756,491 titled "Overlapping Spectrum Cellular Communication Networks", technological approaches are described that allow up to four service providers in the Air-to-Ground services bands of 849-851 and 894-896 MHz by implementing rules that effectively isolate competing cellular systems. The deck-to-deck cellular system takes advantage of a number of multiple system isolation mechanisms that are available for airborne systems:

Cross-Duplex Operation. Having them operate on opposite duplex or reverse band schemes can double the number of carriers hosted within the air-to-ground band. The first carrier uses the lower band for ground-air links and the higher band for air-ground links, while the second carrier utilizes the lower band for air-ground links and the higher band for ground-air links.

Frequency Offsets. Commercial systems that are candidates for providing broadband services to aircraft have channel bandwidths of 1.25 MHz. By offsetting the carrier assignments within the 2 MHz bands, with partial overlap of channel assignments, additional isolation between the two systems can be achieved.

Cross-Polarization. The number of carriers operating within the air-to-ground band can be redoubled, to a total of four, by utilizing the further isolation available by assigning orthogonal polarizations to the carriers.

When these mechanisms are incorporated into Air-to-Ground cellular networks, the isolation between the systems operated by a number of service providers allows each carrier to operate with negligible impact from other service providers.

The co-pending U.S. patent application Ser. No. 10/756,491 titled "Overlapping Spectrum Cellular Communication Networks" taught that multiple competitive carriers could, in total, support more total capacity than would likely be supported by a single carrier utilizing a given block of spectrum. These spectrum enhancement concepts are extensible to deck-to-deck coverage disclosures herein.

Deck-to-Deck Coverage

FIG. 1 illustrates, in block diagram form, the architecture of the deck-to-deck cellular system. In FIG. 1, a plurality of dual mode cellular phones that are located on an aircraft are shown in radio frequency contact with both a terrestrial air-to-ground cellular network and a terrestrial cellular network, both of which are connected to the Public Switched Telephone network (PSTN) as well as other terrestrial networks. The terrestrial air-to-ground cellular network provides a deck-to-deck coverage region for the dual mode cellular phones from takeoff to in-flight to landing, while the terrestrial cellular network provides coverage for the dual mode cellular phones while the aircraft is on the ground. The present deck-to-deck cellular system is comprised of elements of both the terrestrial air-to-ground cellular network and the terrestrial cellular network, as is described below.

Glide-Slope Corridor for Take-Offs and Landings

Figure 6:
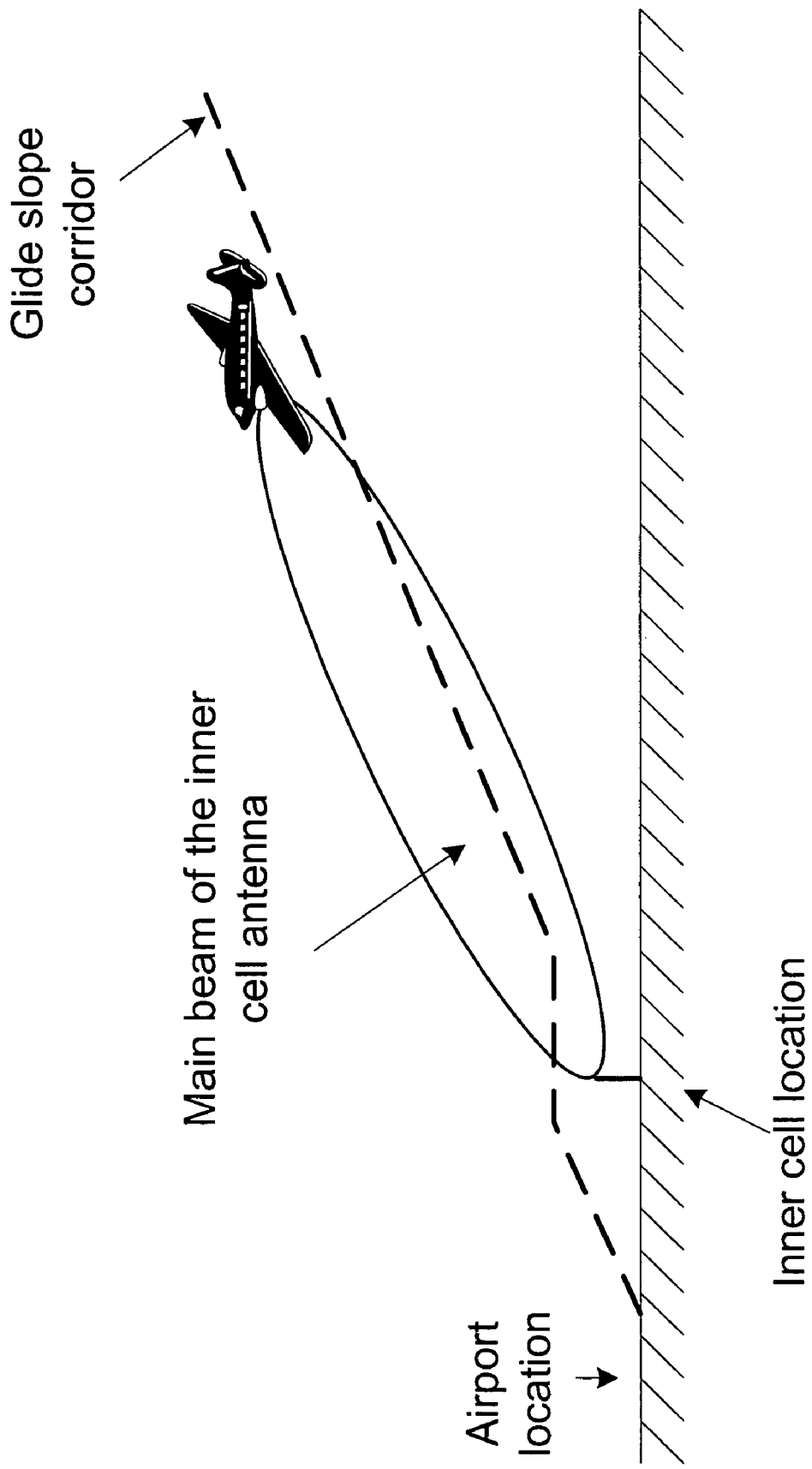
FIG. 6 illustrates the glide-slope flight pattern at a typical airport that consists of a conical region of space that is tilted at a slight angle to permit take-offs and landings.

All airports have a glide-slope corridor for take-offs and landings. The glide-slope is a conical region of space that is tilted at a slight angle to permit take-offs and landings that do not seem, from a passenger's perspective, to be too abrupt. FIG. 6 illustrates the glide-slope flight pattern at a typical airport that consists of a conical region of space that is tilted at a slight angle to permit take-offs and landings. For proper cellular coverage within the Inner Cell envelope, the antenna pattern(s) need to closely replicate the three-dimensional shape of the glide-slope.

Figure 2:
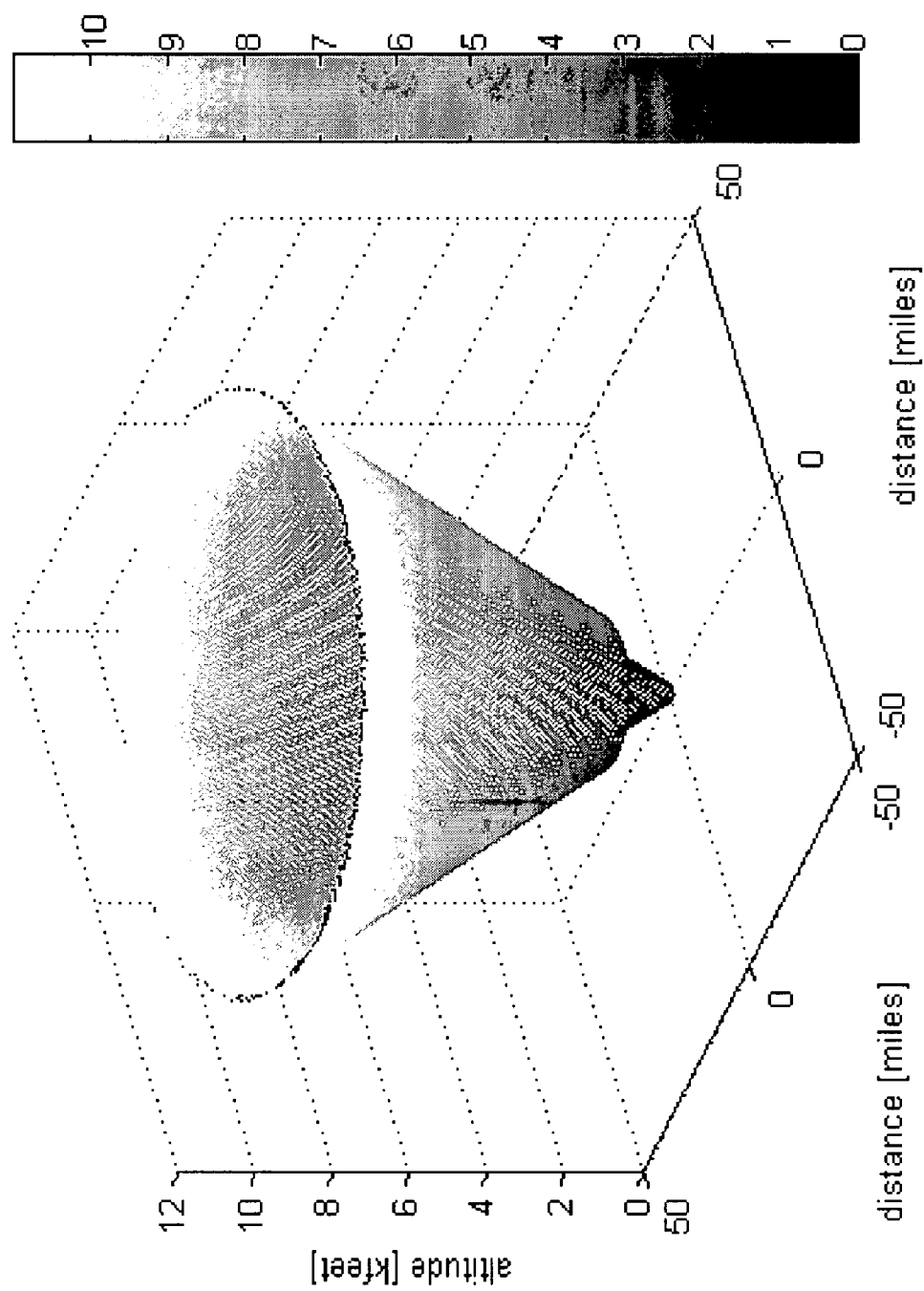
FIG. 2 illustrates the aggregate coverage region of the composite Inner Cell and the Airport Cell.

In conjunction with this glide slope, larger commercial airports have a (TCA), which looks much like an upside down wedding cake where the lower layers are the smallest and the upper layers are the largest. The Terminal Control Area airspace is managed by FAA air traffic controllers to maintain aircraft separation in both vertical and horizontal dimensions. For the deck-deck spatial coverage required by a multi-celled wireless network, the aggregate coverage region of the composite Inner Cell and the Airport Cell is shown in FIG. 2. Note that the vertical axis is in feet while the two horizontal axes are in miles. The lowermost portion of this coverage region is a very small downward pointed cone; this is the Airport Cell coverage region (below 500 feet AGL). The large conical section, comprised of the locus of space from 500 feet to 10,000 to 11,000 feet is the Inner Cell coverage volume.

Deck-To-Deck Service Requirements

Aircraft in the vicinity of airports operate in a tightly controlled airspace, with a multitude of runways and associated approach corridors. For example, O'Hare Airport in Chicago has 4 "arrival gates," each roughly 40 miles from the airport. Aircraft cross these points at about 11,000 foot altitude, and Air Traffic Control (ATC) routes each aircraft to an active runway selected for landing. O'Hare Airport also has 6 runways, and each may be used from either direction, thereby defining 12 different approach corridors to the airport. Each approach corridor has a glide slope of 3 degrees, extending out 4-6 nautical miles, to altitudes ranging from 2100 feet to 2500 feet (1450 feet to 1850 feet Above Ground Level measured from the runway altitude of ~650 feet). Air Traffic Control routes each aircraft between the arrival gate and the outer marker that defines the beginning of the approach corridor, typically maintaining a minimum aircraft horizontal separation of 5 nautical miles (5.75 statute miles) and 1000 feet vertical separation. The last 2-4 miles before reaching the approach corridor, the aircraft is generally at an altitude of 2500 feet (AMSL), and can easily transition to the glide slope.

Aircraft departing from O'Hare must climb to 4000' altitude within 8 miles, then climb to and maintain 5000 feet until advised by Air Traffic Control. Typically, once departing aircraft are 15-20 miles from the airport, they will be cleared to climb away to en route flight paths at altitudes much above 10,000 feet. This means that the flight paths for arriving aircraft within the "bowl" define departing aircraft.

The objective of the deck-to-deck cellular system is to enable multiple cellular communication service providers (carriers) to cover the space inside the bowl while also:

assuring that no carrier has a particular competitive advantage over other carriers by virtue of site selection assuring that levels of base-base interference will not unduly degrade service capabilities of any carrier and will allow sufficient data rates to offer a broadband user experience;

not limiting the ability of any one carrier to expand system capacity in the vicinity of the airport, and not creating a requirement that other carriers may have to modify their systems to allow another carrier to expand its capacity.

Figure 3:
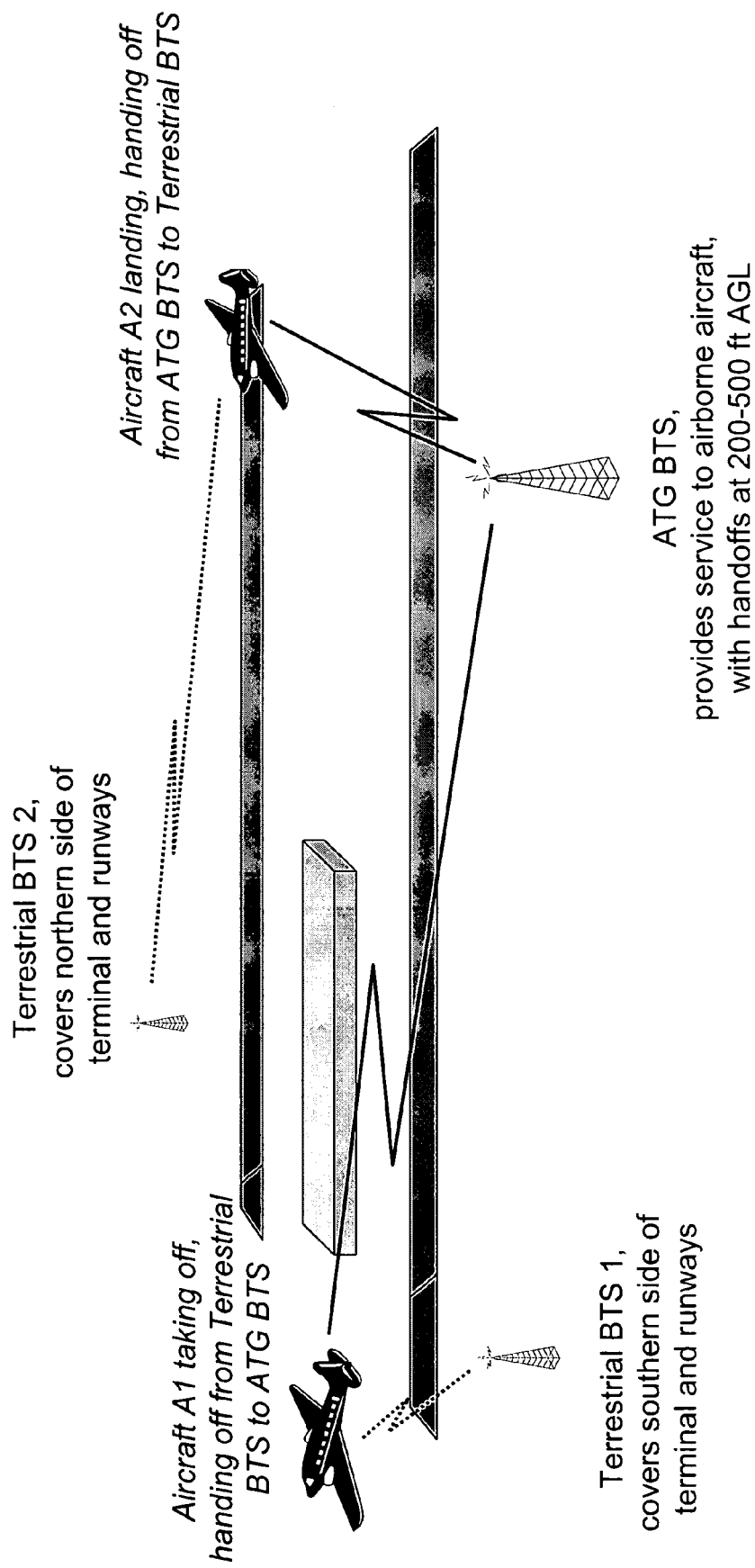
FIG. 3 illustrates an example of the communications provided by the deck-to-deck cellular system in a typical arrival/departure scenario.

FIG. 3 illustrates an example of the communications provided by the deck-to-deck cellular system in a typical arrival/departure scenario. In this generic example, the deck-to-deck cellular system is illustrated as a single network solution where two Base Transceiver Systems of the terrestrial cellular network, BTS 1 and BTS 2, form the coverage region for the composite Inner Cell. BTS 1 is positioned to provide a cellular coverage region at the southern side of the terminal and runways, while BTS 2 is positioned to provide a cellular coverage region at the northern side of the terminal and runways. In addition, a terrestrial Air-to-Ground (cellular) Base Transceiver System (ATG BTS) provides service to aircraft that are airborne, and located within the above-described cone of coverage provided by the Inner Cell. An aircraft A1 taking off from the airport is located within the coverage area of BTS 1 of the terrestrial cellular network until it reaches a predetermined flight altitude, at which time the aircraft A1 enters the coverage region of ATG BTS of the terrestrial air-to-ground cellular network, where the call traffic from aircraft A1 is handed off from BTS 1 of the terrestrial cellular network to ATG BTS of the terrestrial air-to-ground cellular network. Similarly, an aircraft A2 landing at the airport is located within the coverage area of ATG BTS of the terrestrial air-to-ground cellular network until it reaches a predetermined flight altitude, at which time the aircraft A1 enters the coverage region of BTS 1 of the terrestrial cellular network, where the call traffic from aircraft A2 is handed off from ATG BTS of the terrestrial air-to-ground cellular network to BTS 1 of the terrestrial cellular network.

Figure 4:
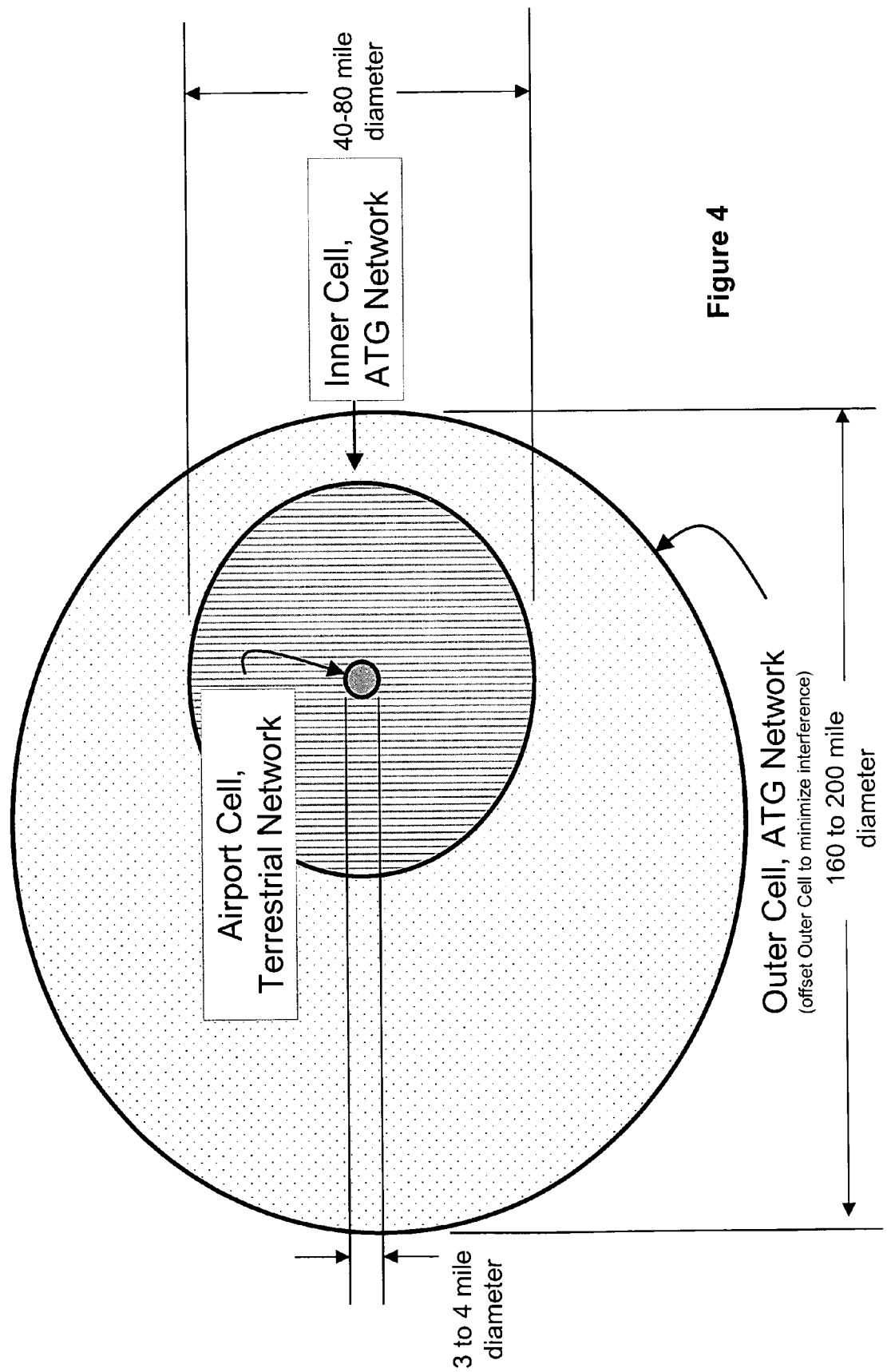
FIG. 4 illustrates a plan view of cell coverage areas of the deck-to-deck cellular system in a typical airport installation as an aircraft transitions from the Airport Cell to the Inner Cell.
Figure 5:
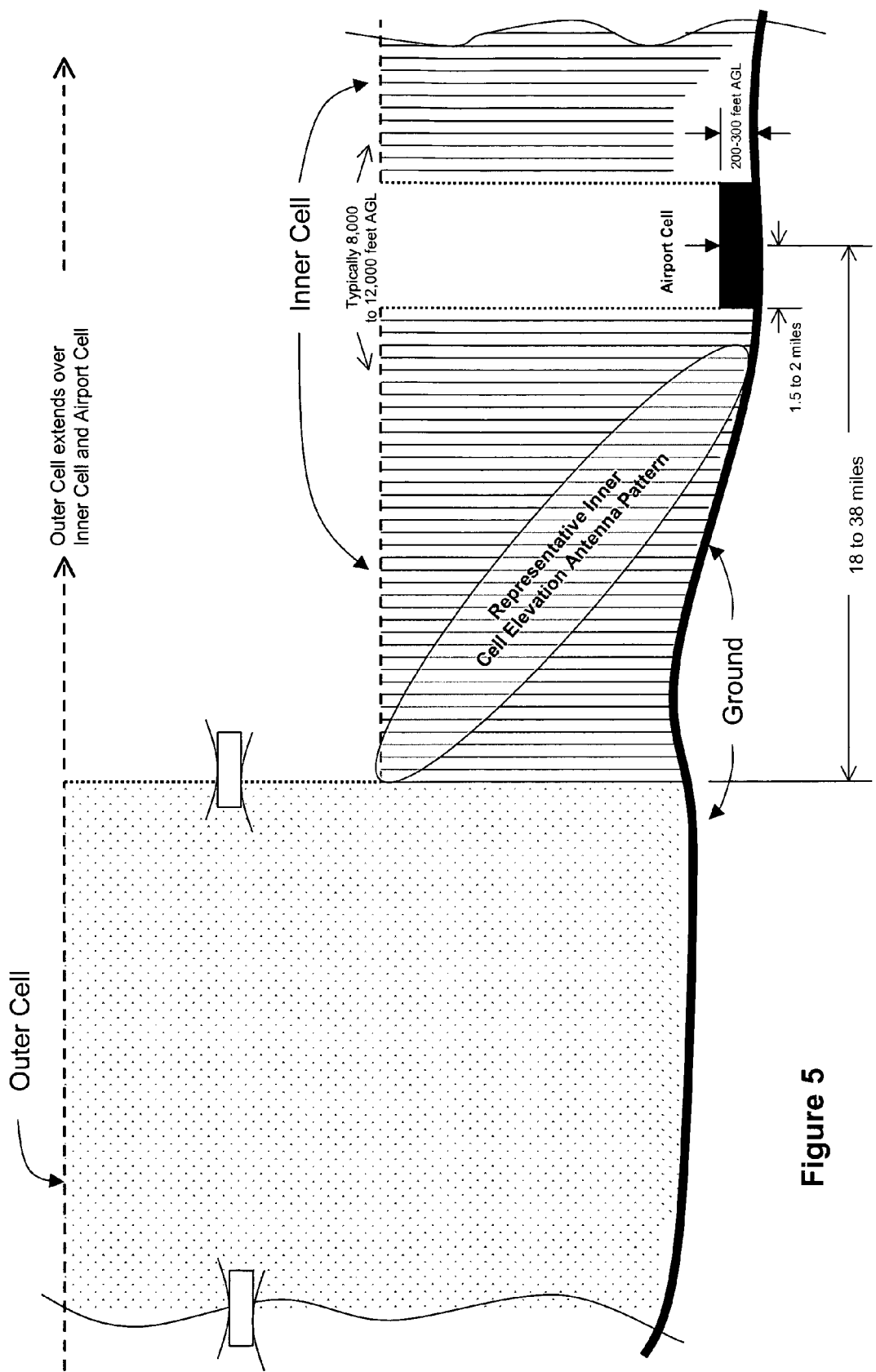
FIG. 5 illustrates a cross-section view of a typical vertical cell coverage volume of the deck-to-deck cellular system in a typical airport installation.

FIG. 4 illustrates a plan view of typical cell coverage areas of the deck-to-deck cellular system in a typical airport installation as an aircraft transitions from the Airport Cell to the Inner Cell and FIG. 5 illustrates a cross-section view of a typical vertical cell coverage volume of the deck-to-deck cellular system in a typical airport installation. The Outer Cell is shifted so it is not concentric with the Inner Cell and the Airport Cell. This is done to minimize interference. While the exact Outer Cell offset distance from a given airport is dependent on the surrounding terrain (e.g. mountainous or flat prairie), in general an offset of at least 55 miles is sufficient spatial separation between cell site locations to ensure adequate reduction of interference, intra- and inter-network. In FIG. 5, typical dimensions and configurations of the Airport Cell, Inner Cell and Outer Cell are provided for illustration purposes, and these dimensions and configurations can vary, yet retain the features of the deck-to-deck cellular system described herein. In particular, FIG. 5 illustrates an Airport Cell that is located at an airport, is part of the terrestrial cellular network, and that provides a coverage region proximate to the ground and covering an area around the airport of radius approximately 1.5 to 2 miles. The Inner Cell is part of the terrestrial air-to-ground cellular network and represents the coverage region of ATG BTS of the terrestrial air-to-ground cellular network as shown in FIG. 4. The Inner Cell uses antenna patterns that are up-tilted, as described below, to provide coverage in the region of space immediately surrounding the airport. The Outer Cell is also part of the terrestrial air-to-ground cellular network and provides coverage in the region surrounding the Inner Cell and above the Inner Cell—Airport Cell area for aircraft flying at high altitudes (above 10,000 feet).

FIG. 6 illustrates in greater detail the spatial pairing of the Inner Cell's main beam antenna pattern with the pre-defined glide-slope corridor used by aircraft during take-off and landing cycles. The Inner Cell cell-site is located 8-10 miles from the airport center to minimize interference to/from other Inner Cell cell-sites (same network or competitive network). The Inner Cell antenna pattern to glide slope pairing is accomplished for all defined glide slope corridors for a given airport.

Airport Network Configurations

Aircraft spend only a small fraction of their flight schedules within the arrival/departure airspace of an airport. Furthermore, current air traffic control regulations heavily restrict the use of passenger devices that generate the levels of communications traffic that are expected while aircraft are en route to their destinations. At most airports, these low levels of communications traffic are likely to be served by a single base station. In order to avoid unnecessarily restricting the growth of network capacity, the operators should be able to expand airport configurations in fashions similar to those that they would use to expand capacity on the cross-country portion of their networks. In particular, carriers should be free to add additional base stations in a "cell-splitting" approach, dividing the served airspace into smaller segments, in order to increase the overall capacity of the local network.

Aircraft often spend extended periods of time positioned at ramps or on taxiways, where passengers could generate large levels of communications traffic. If deck-to-deck communication traffic levels are large, the levels of communication traffic generated on the ground will be much larger since many more aircraft are located there than are between the runways and 10,000 feet altitude. Large levels of traffic can easily be accommodated seamlessly by provisioning aircraft with dual band radio systems capable of communicating with terrestrial cellular network facilities while on the ground, and handing over to terrestrial air-to-ground cellular network facilities when airborne. This assures seamless service for the users of all on-board services.

The deck-to-deck architecture can be combined with advanced air-to-ground network architectures such as taught in the co-pending application filed on Sep. 30, 2005 and titled "System For Managing Call Handoffs Between An Aircraft And Multiple Cell Sites". This is accomplished by providing communications services to an aircraft using an "outer network" comprising base stations and switching equipment and an "inner network" which provides transport capabilities between the outer network elements located onboard the aircraft, and the terrestrially located outer network elements. The inner network provides a broadband bidirectional air-to-ground channel which carries all subscriber traffic, signaling and administrative data relating to the provision of services in the aircraft (also termed "feature set data"), typically using multiple virtual channels for each of the subscriber traffic and the signaling and administrative data. In this manner, the deck-to-deck cellular system maximizes the capacity available from terrestrial air-to-ground cellular systems, while also integrating communications capabilities from the terrestrial cellular systems in much the same manner that handovers occur from air-to-ground cell to air-to-ground cell while the aircraft is airborne. Such terrestrial cellular network facilities can be designed to meet large call capacity requirements, accommodating virtually any demand level with no impact on the capacity of the terrestrial air-to-ground cellular system.

Figure 7:
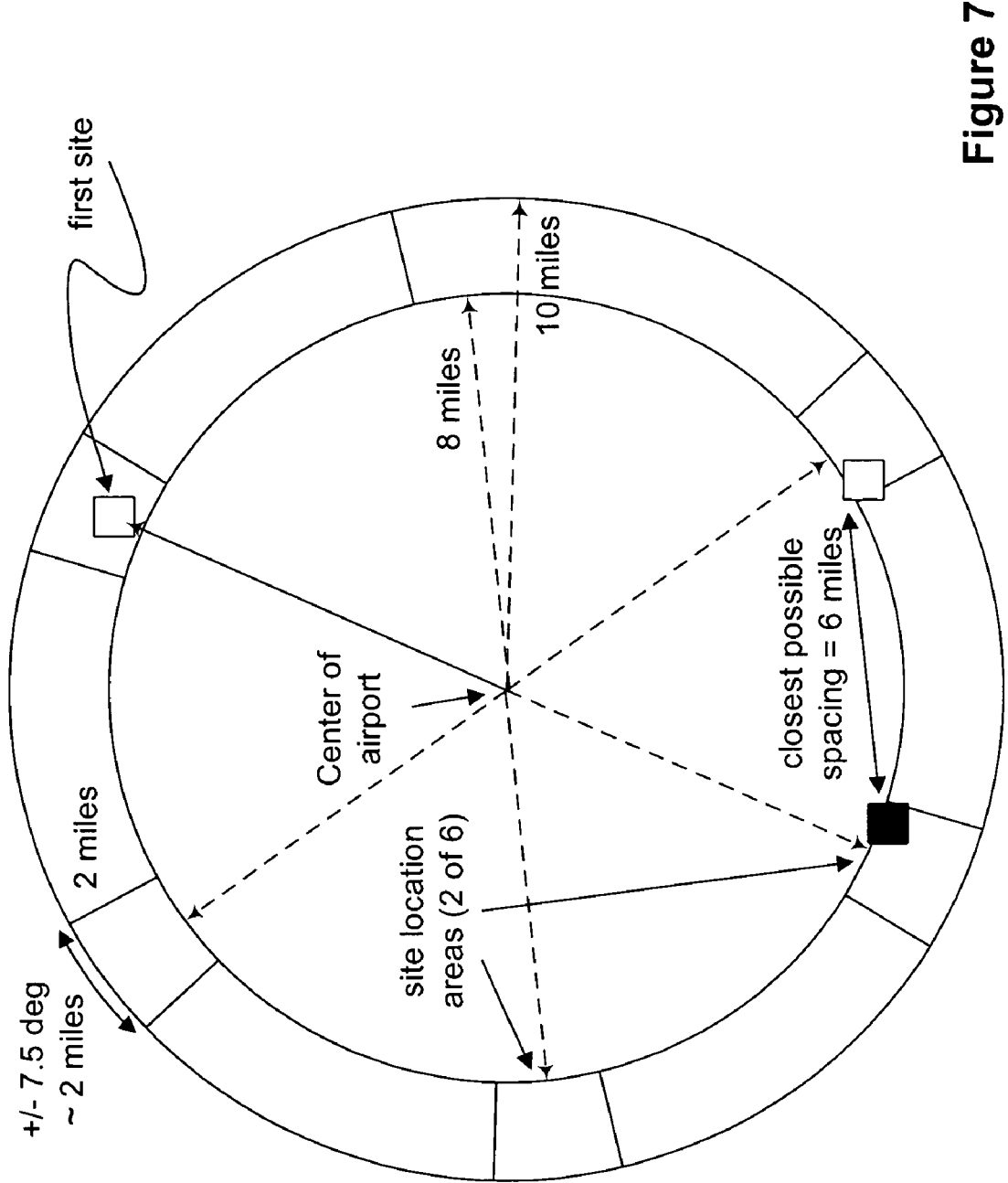
FIG. 7 illustrates a configuration of air-to-ground base stations, positioned equidistantly from the center of the airport that offer each carrier an equal opportunity to serve the airspace in the vicinity of the airport.
Figure 12:
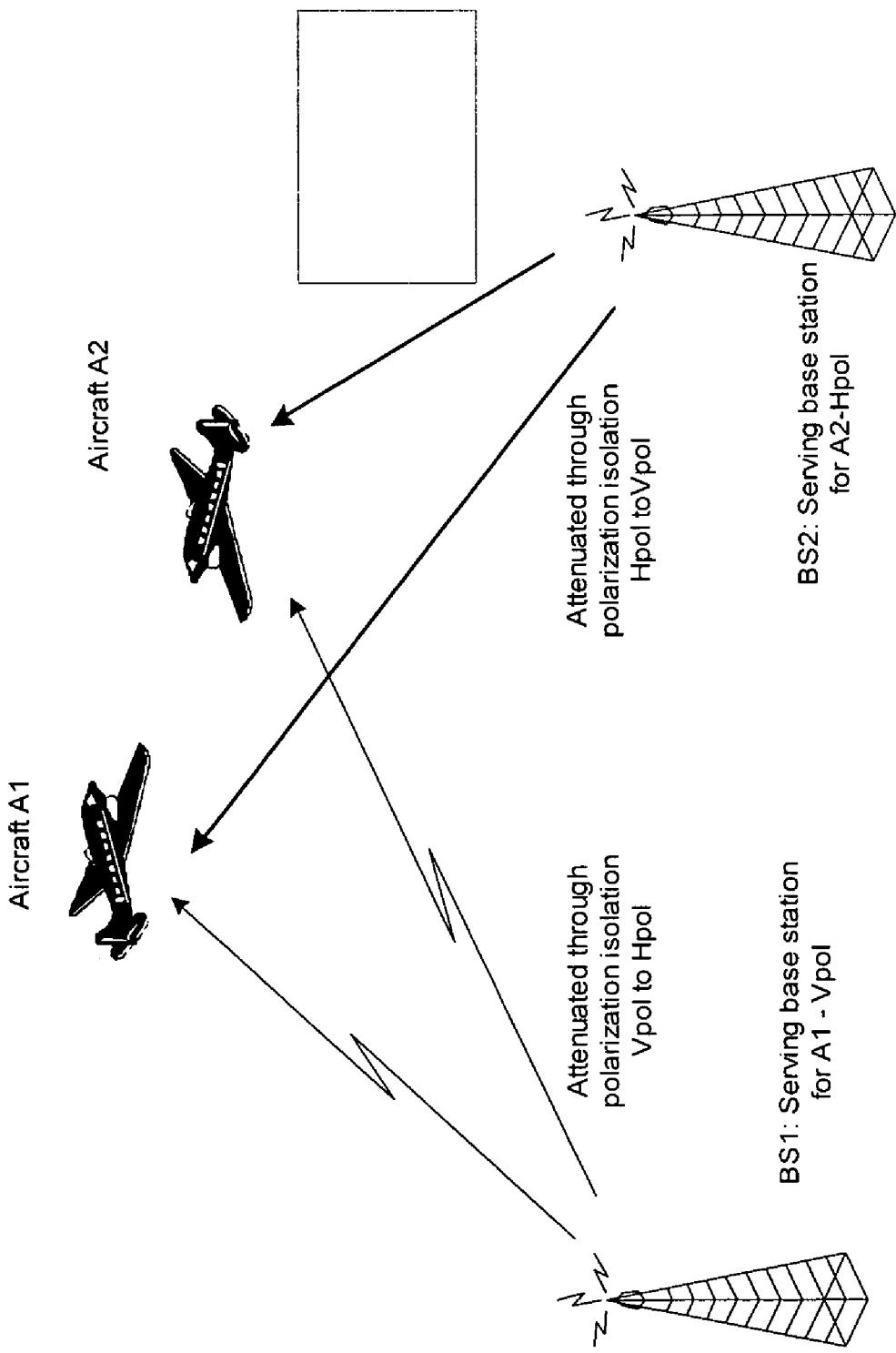
FIG. 12 illustrates a cross-duplexed, substantially overlapped multiple system spectrum allocation for the deck-to-deck cellular system.

FIG. 7 illustrates a first configuration of terrestrial air-to-ground cellular base stations which in aggregate create an Inner Cell coverage volume, positioned equidistantly from the center of the airport that offer each carrier an equal opportunity to serve the airspace in the vicinity of the airport. This two carrier scenario uses a plurality of terrestrial air-to-ground cellular base stations that are positioned equidistantly from the center of the airport will offer each carrier an equal opportunity to serve the airspace in the vicinity of the airport—in effect each site would be placed on (or near) a ring centered on the airport. FIG. 12 illustrates a cross-duplexed, substantially overlapped multiple system spectrum allocation for the deck-to-deck cellular system. Two cross-duplexed carriers can serve an airport and each carrier can have as many as three sites around an airport while maintaining adequate base-base isolation and providing good coverage of the airspace. While there likely would be only a need for one site per carrier at the outset, the approach disclosed herein would facilitate as many as three sites on the ring per carrier. If additional capacity is required, it would be very feasible to add additional cells farther from the airport, further subdividing the airspace to allow each site to serve a smaller portion of the overall communications traffic. This would conceptually have an "Inner Inner Cell" and an "Outer Inner Cell", if it were two nested rings, both comprising a composite Inner Cell. This approach therefore meets the objective of providing a network evolution path should one or more of the carriers need additional capacity within the airport airspace.

Antenna Patterns for Airport Installation of Inner Cell Base Transceiver Systems Carriers that need three sites to provide adequate capacity at an airport will require that the three antenna systems be directional, with the antennas pointed away from the airport, in order to avoid excessive self-interference. In addition, to minimize interference between base stations of the cross-duplex providers, it is required that a null of the radiation pattern be placed on the horizon.

Figure 8:
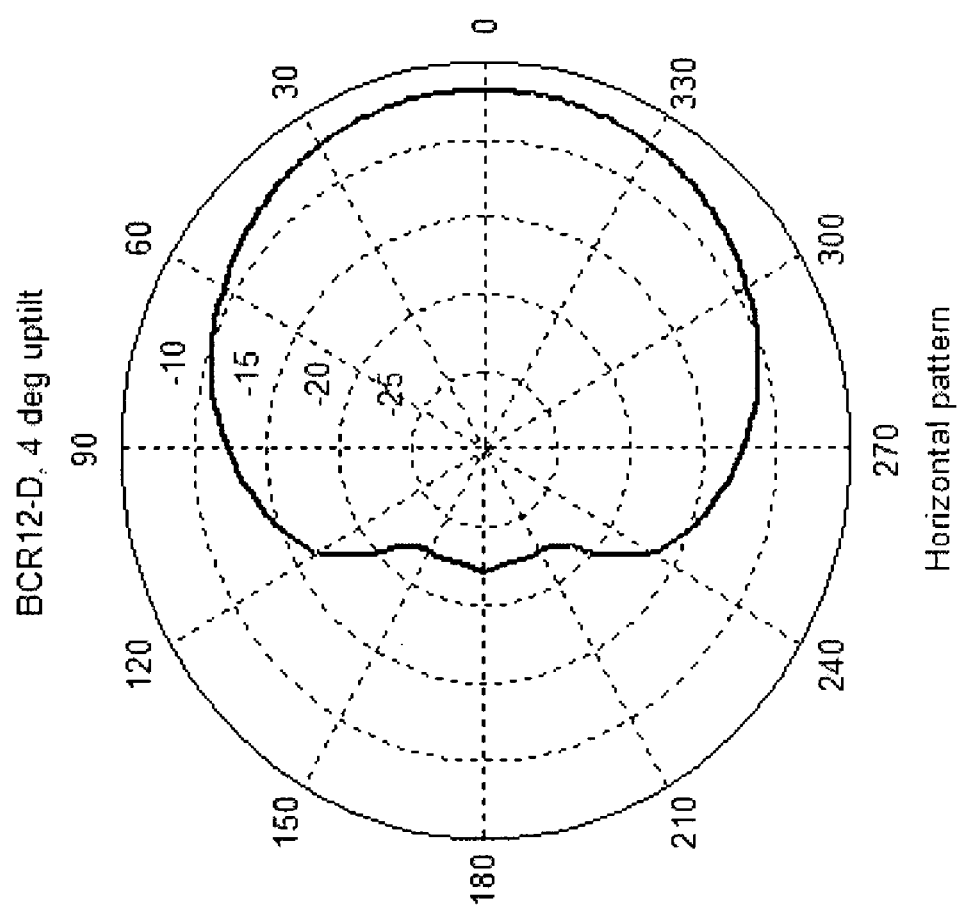
FIG. 8 illustrates, in azimuth view, a typical directional antenna pattern used in the deck-to-deck cellular system.
Figure 9:
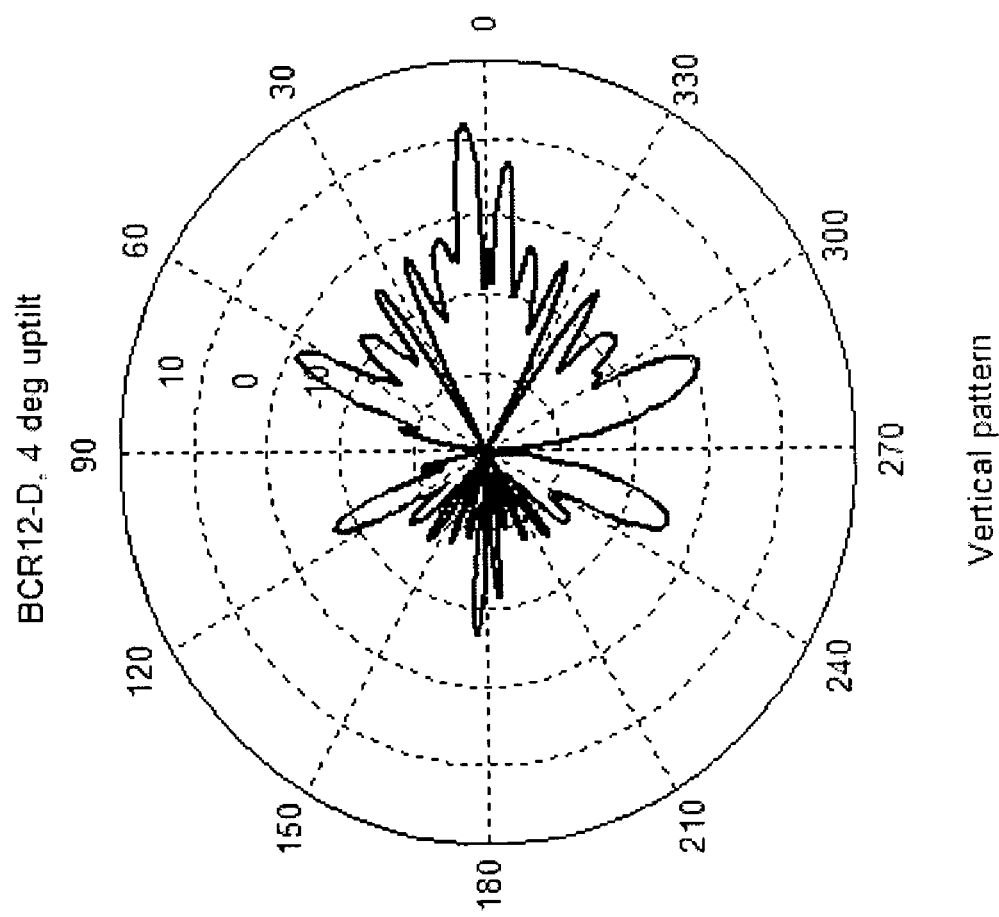
FIG. 9 illustrates, in elevation view, a typical directional antenna pattern used in the deck-to-deck cellular system.

FIG. 8 illustrates, in azimuth view, a typical directional antenna pattern used in the deck-to-deck cellular system, and FIG. 9 illustrates, in elevation view, a typical directional antenna pattern used in the deck-to-deck cellular system. These patterns are from commercially available antennas, inverted to provide up tilt rather than down tilt, and with a slight modification to aim the null directly onto the horizon (4 degree tilt rather than 3 degree tilt). The up tilt could be electrical or mechanical, or both. Antennas most suited for air-to-ground service are usually manufactured to a specific set of requirements for up tilt and upward null fill, and any other application specific needs.

FIG. 7 shows the required cell site deployment locations for a two network Inner Cell. The cell sites are located on a ring 8 to 10 miles from the airport center. The cell site location is located on an arc of approximately +/−7.5 degrees creating an arc length of approximately 2 mile. The first carrier (sites marked with black) has three sites located at azimuths 90, 210 and 330 degrees on the ring (only one site is shown in black on FIG. 7), and the second carrier has three sites located at azimuths 30, 150 and 270 degrees (two sites shown marked with a white box). Spacing between cross-duplexed sites is 6 miles.

Key Design Elements

From a detailed technical analyses of various airport scenarios, it has been determined that deck-to-deck coverage can be enabled by ensuring that sites serving the airport (1) limit transmit power towards the horizon (by a combination of up tilted antennas and/or reduced transmitter power), and (2) observe minimum site spacing requirements as described herein. Other key considerations include:

1. Reduced base station separation for X-duplex carriers through use of antennas with null pointing towards X-duplex sites (horizon oriented nulls)
2. Minimize near-far effects for co-duplex carriers by i) locating sites in close proximity to each other, ii) utilizing Vertical and Horizontally polarized antennas with similar antenna patterns, and iii) using similar EIRP levels for both base stations and aircraft
3. Minimize near-far effects for co-duplex carriers on cross country routes, while allowing "un-paired" sites by using antennas with low gain towards aircraft "close" to the site (e.g. vertical +/−70 degrees).
4. Handover to/from terrestrial cells when aircraft is arriving at/departing from airport, with service maintain via terrestrial cells when aircraft is on the ground.
5. Offset Outer Cell cell-site by approximately 55 miles from the airport.

Airport that has Limited Capacity Needs

Figure 10:
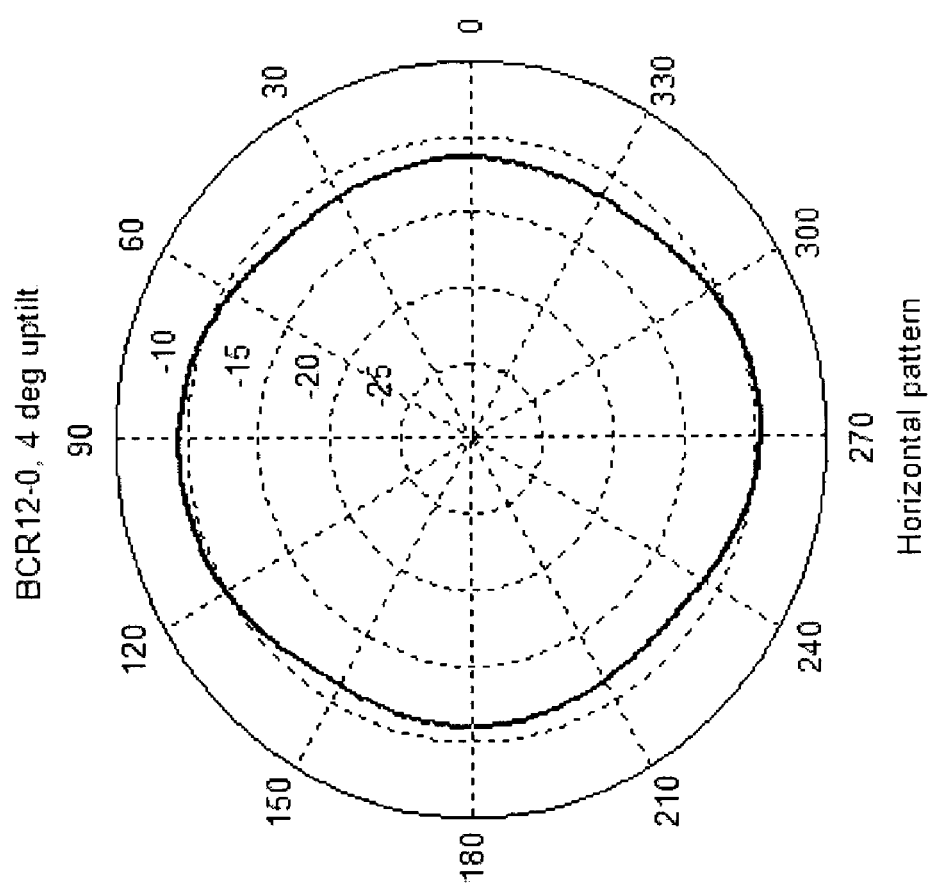
FIGS. 10 and 11 illustrate omni-directional antenna patterns for the Inner Cell, in azimuth and elevation, respectively, that are used for an airport that has limited capacity needs.
Figure 11:
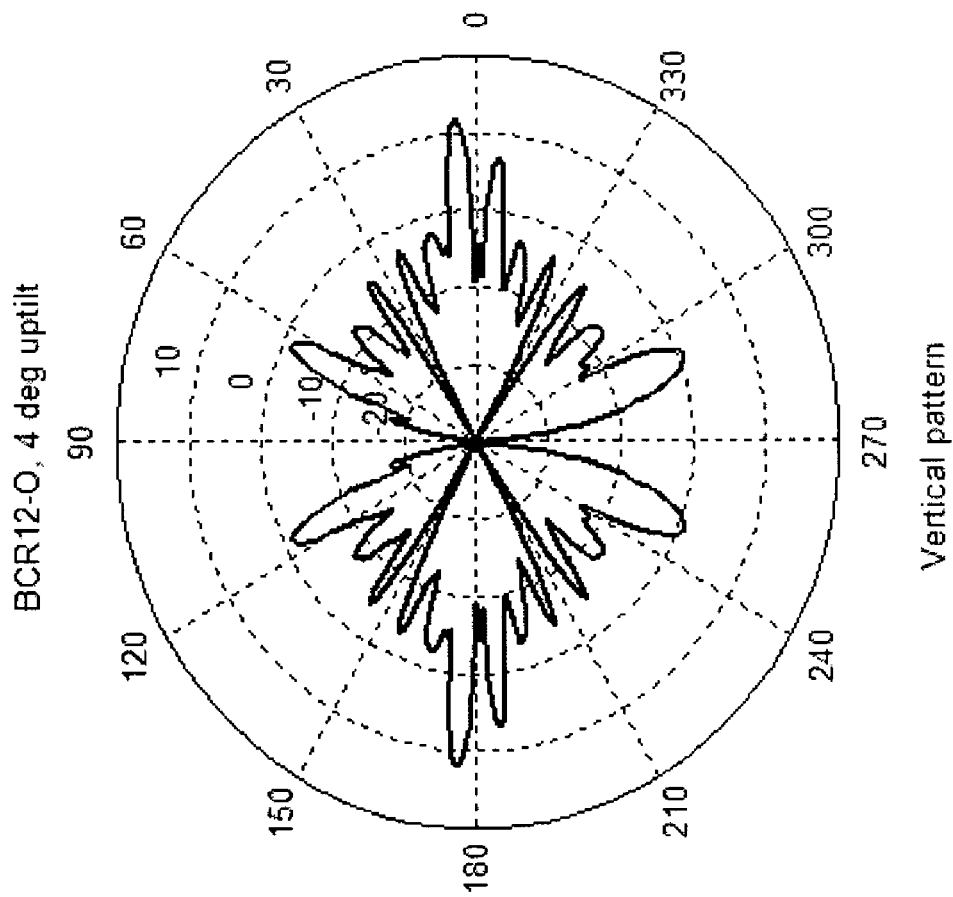

FIGS. 10 and 11 illustrate omni-directional antenna patterns for the Inner Cell, in azimuth and elevation, respectively that are used for an airport that has limited capacity needs. Note that for the two closer site locations, the 1 dB interference to Thermal Noise Floor (TNF) ratio would require that some additional isolation would be required for two omni sites. If either site has a directional antenna, there would be adequate discrimination towards the omni site located at 90 degree azimuth to assure that interference levels would be well below the TNF. The levels of interference are further reduced if the radius of the site ring is increased. Base-base interference objectives can be met for configurations with sites located six miles or more from the airport center, provided that omni configurations use sites on the opposite sides of the airport. A need for some site location flexibility suggests that an 8 mile ring radius be considered as a practical minimum, in order to allow a reasonably large site "search ring" to be used.

Airport that has Higher Capacity Needs

Figure 13:
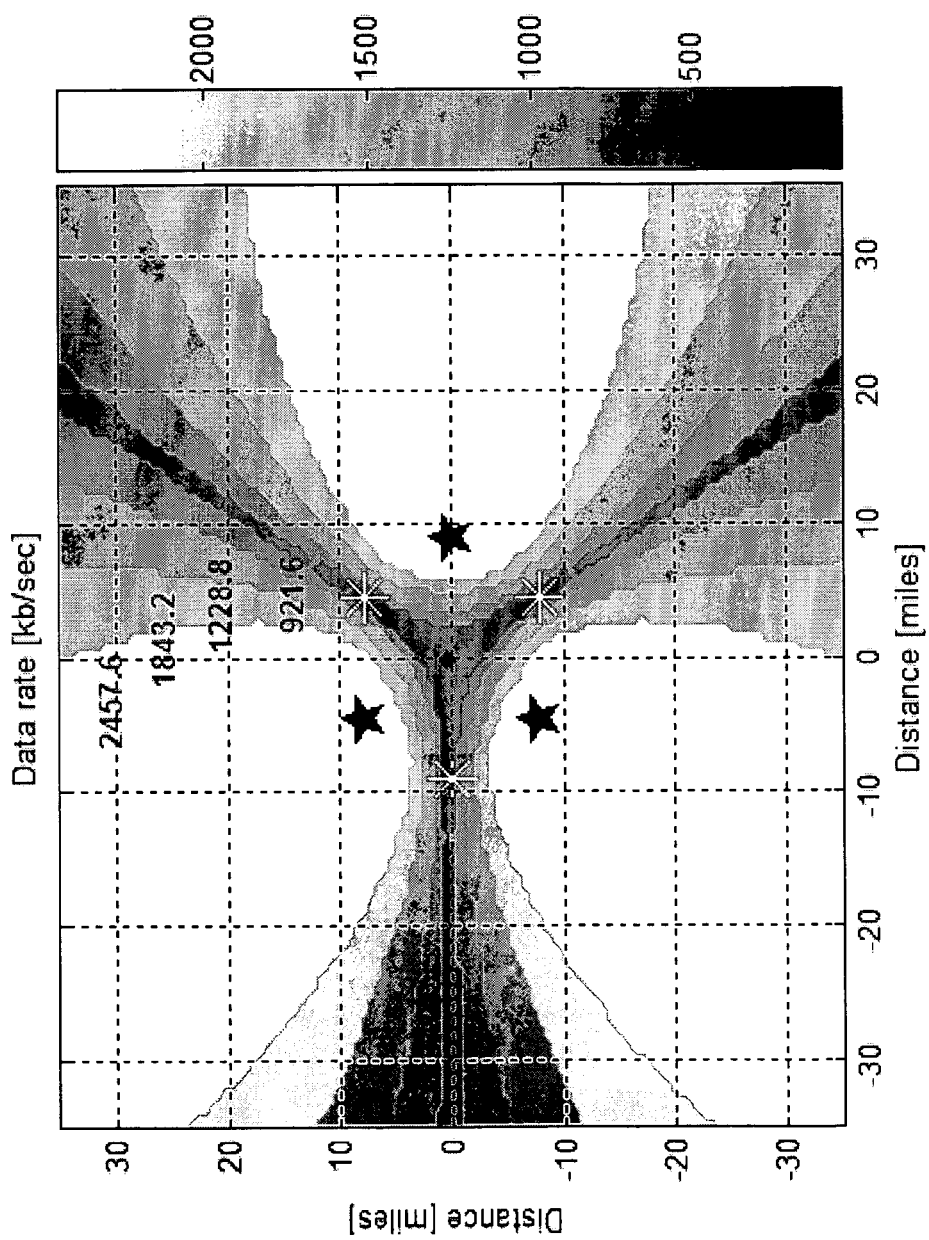
FIG. 13 illustrates the forward link data rates that can be achieved with 9 miles range.
Figure 14:
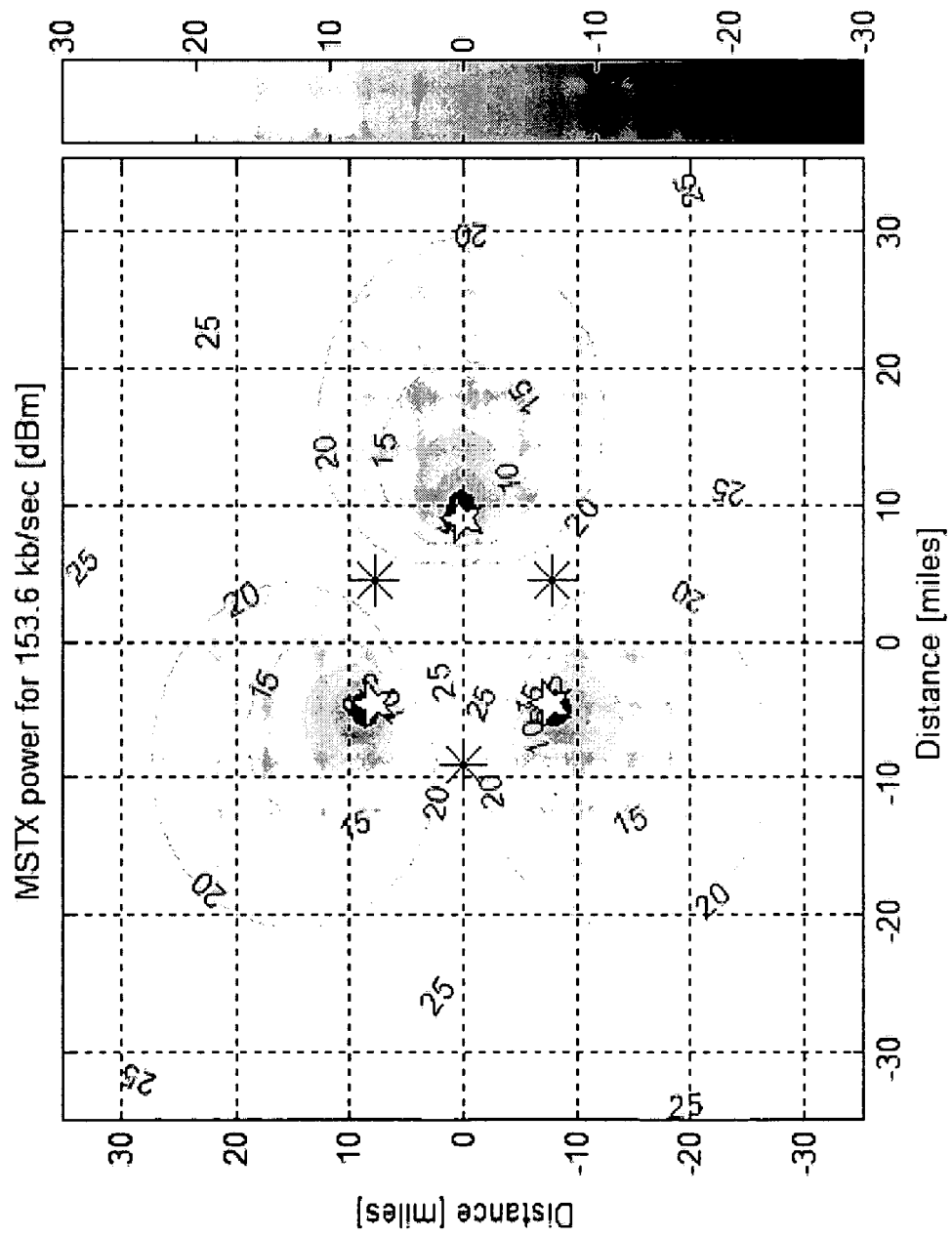
FIG. 14 illustrates that reverse link data rates of 153.6 kbps can be maintained over the entire arrival/departure airspace.

FIGS. 13 and 14 herein illustrates typical forward and reverse link data rates that can be achieved with 9 miles respectively for an azimuthally tri-sectored Inner Cell. In FIG. 13, the Inner Cell cell-sites are located on a ring 9 miles form the airport center and are equally spaced on the ring.

FIG. 13 shows the predicted forward link data rate of 2457.6 kbps over the majority of the area. In the coverage boundary between sites the rates are lower, with a minimum rate of 614.4 kbps being experienced in a very small portion of the area. FIG. 14 shows that reverse link data rates of 153.6 kbps can be maintained over the entire arrival/departure airspace. The maximum transmit power required to sustain this rate is about +10 dBm. These low transmit power requirements also assure that aircraft can operate at adequate data rates even if cross-duplexed aircraft are landing on parallel runways.

Inter-Network Interconnection for Seamless Handoffs

Figure 15:
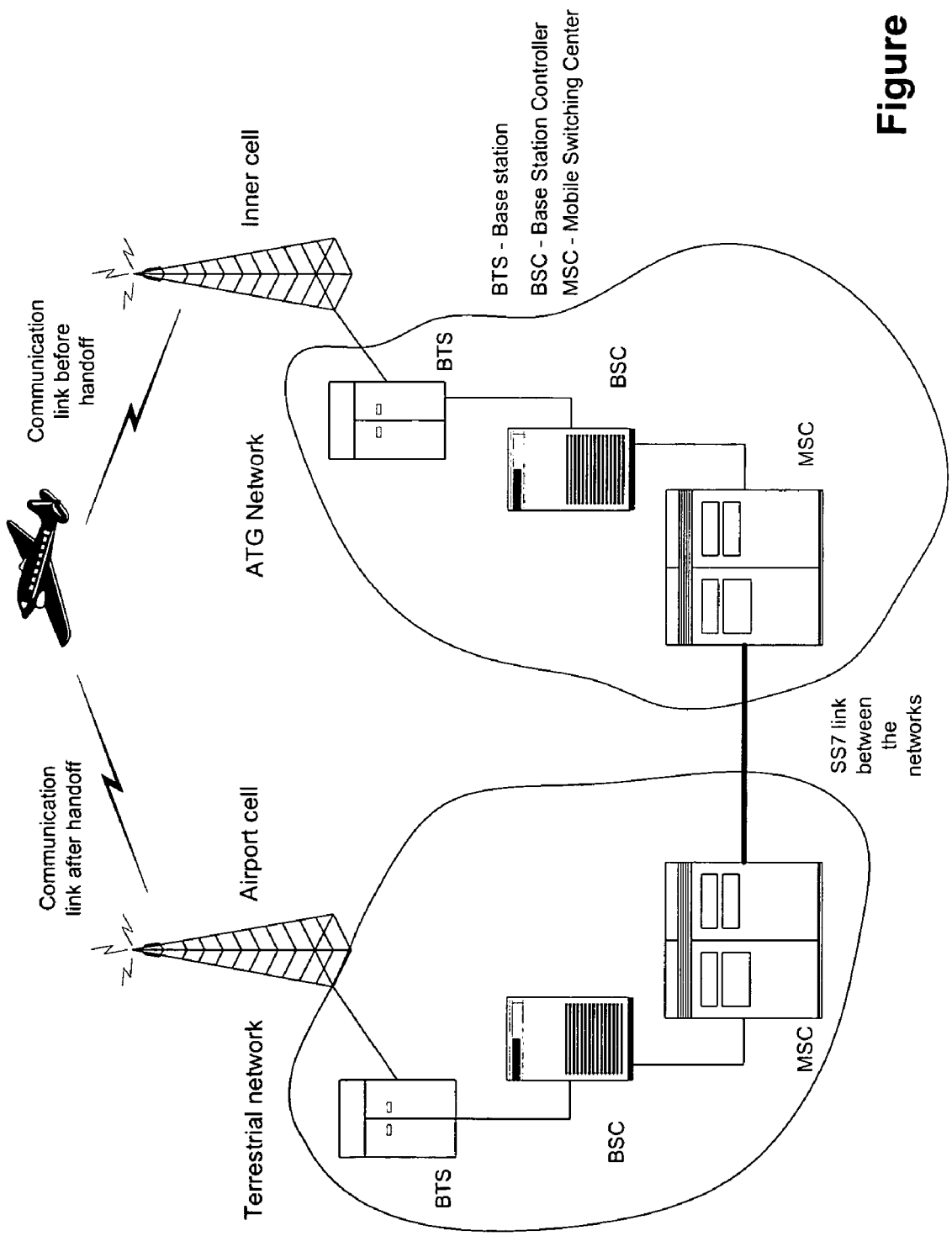
FIG. 15 illustrates the inter-connection between the Terrestrial Air-to-Ground Network and the Terrestrial Network to enable inter-network handoffs.

FIG. 15 illustrates in greater detail how the signaling is accomplished between the Airport Cell (TCN) and the Inner Cell (air-to-ground) networks to realize bi-directional handover capability. In FIG. 15, the aircraft is initially on the terrestrial air-to-ground Network (Inner Cell) and is proceeding to land at a given airport. At the predetermined spatial-altitude location, the aircraft hands off (hands over) to the Airport Cell, a part of the Terrestrial Cellular Network (TCN). The aircraft then lands and continues to communicate on the Terrestrial Cellular Network. The signaling for a handoff is accomplished in means well understood in the art through inter-network SS7 signaling (or other signaling means defined by a given inter-network connection standard).

Unless otherwise configured, the area in the immediate vicinity of the airport (a radius of 1.5-2 miles) may have minimal or limited coverage due to the combination of the Inner Cell antenna pattern null on the horizon and the likelihood of "clutter" between the airport and the base station locations. Handing off at an altitude of 200-300 feet Above Ground Level between the Air-to-Ground Network and the Terrestrial Cellular Network (Inner Cell to Airport Cell, respectively) ensures that communications capability is available for: ramp, taxiway and runway communications service. Therefore, hand-off to/from the Air-to-Ground network to the terrestrial system covering the ramps, etc., take place between 200-300 feet Above Ground Level under this approach to facilitate deck-to-deck service.

It is therefore entirely feasible for two carriers to deploy full deck-to-deck broadband service to serve the airspace in the vicinity of the airport, while avoiding service degradation caused by base-base interference. Provided carriers respect reasonable site location rules and some easily achieved antenna system configurations, service may be provided by omni sites, with the option for either or both carriers to expand capacity by using a network of directional sites.

Four Carrier Scenarios

To allow four carriers to serve the airport requires adding additional sites on the ring and employing cross-polarized antenna system to provide isolation from the initial two carriers. The same mechanisms that supported such operation in cross-country routes apply to the airport environment. Since each system is required to observe spatial separation from the two cross-duplexed systems, base-base interference is not an issue even with the additional cross-polarized sites added to the ring to accommodate the additional carriers. The possibility of near-far problems is also entirely avoided, because co-duplexed but cross-polarized systems are in close proximity (if not in fact collocated) as a consequence of both being distanced from the cross-duplexed sites. Path losses from aircraft to cross-polarized, co-duplex sites are at very similar levels due to the minimum distance between the site ring and any aircraft "within the bowl" as shown in FIG. 2. Paths to all aircraft from any base station are line-of-site and are not affected by any signals reflected from the ground due the discrimination against ground reflections provided by the up tilted antennas. There are no near-far problems for cross-polarized sites that are on the same ring position.

SUMMARY

Deck-to-deck service can be implemented in the vicinity of airports with relatively simple constraints to guide the selection of sites. The coordination activities that may be required by carriers are simple when compared to those that are typically undertaken along many geographic boundaries between cellular or PCS carries that share the same band.

What is claimed:

1. A deck-to-deck cellular communication network for providing communication services to a plurality of wireless subscriber devices that are located in an aircraft when said aircraft is transitioning between flight modes, where said aircraft is served by at least one of a plurality of air-to-ground cells of an air-to-ground cellular network while above a predetermined altitude, and by an airport cell when said aircraft is on the ground at an airport, comprising:

inner cell, which is part of said air-to-ground cellular network and is interposed between said at least one of said air-to-ground cells and said airport cell, to provide cellular communication services exclusively from said air-to-ground cellular network to said aircraft when said aircraft is below a predetermined altitude and not served by said airport cell, comprising:

two sets of co-spectrum air-to-ground cellular base stations that are located on a circumference of a ring centered on the airport, wherein said base stations of each set of co-spectrum air-to-ground base stations are located in pairs consisting of a base station from each set and wherein said base stations of each of said pairs generates radio frequency signals on predetermined frequencies that are non-interfering with other co-spectrum air-to-ground cellular base stations and wherein each set of radio frequency signals is cross-duplexed from each other, and one or more antennas located at each of said co-spectrum air-to-ground cellular base stations having closely matching antenna patterns, similar transmit power levels, compatible air interface technologies, and having elevation patterns that map to the arrival glide slope corridors of said airport; and handoff controller, which is part of said air-to-ground cellular network and responsive to said aircraft transitioning across said predefined altitude, for transferring said cellular communication services provided to said aircraft between said inner cell and said at least one of said air-to-ground cells, exclusively within said air-to-ground cellular network.

2. The deck-to-deck cellular communication network of claim 1, wherein said plurality of co-spectrum air-to-ground cellular base stations are positioned equidistantly from the center of said airport.

3. The deck-to-deck cellular communication network of claim 2 wherein each of said plurality of co-spectrum air-to-ground cellular base stations are located on a ring centered on the airport, spaced equally apart around the circumference of said ring.

4. The deck-to-deck cellular communication network of claim 2, wherein said inner cell further comprises:

wherein each of said plurality of co-spectrum air-to-ground cellular base stations outputs a regulated transmitted power towards the horizon by a combination of up-tilted antennas and reduced transmitter power.

5. The deck-to-deck cellular communication network of claim 1, wherein
said co-spectrum air-to-ground cellular base stations of each of said two sets of co-spectrum air-to-ground cellular base stations are interleaved around a circumference of said ring.

6. The deck-to-deck cellular communication network of claim 5 wherein said co-spectrum air-to-ground cellular base stations are spaced equally apart around the circumference of said ring.

7. The deck-to-deck cellular communication network of claim 5, wherein each of said co-spectrum air-to-ground cellular base stations in said two sets of said co-spectrum air-to-ground cellular base stations outputs a regulated transmitted power towards the horizon by a combination of up-tilted antennas and reduced transmitter power.

8. The deck-to-deck cellular communication network of claim 1 wherein said co-spectrum air-to-ground cellular base stations pairs are spaced equally apart around the circumference of said ring.

9. The deck-to-deck cellular communication network of claim 1 wherein each of said co-spectrum air-to-ground cellular base stations in said two sets of said co-spectrum air-to-ground cellular base stations generate radio-frequency signals on predetermined frequencies that are non-interfering using at least one of the interference avoidance techniques comprising: cross-polarization, partial overlap of frequency assignment, code assignment, time slot assignment, antenna pointing, and wherein each set of radio frequency signals is cross-duplexed from the other set.

10. The deck-to-deck cellular communication network of claim 1 further comprising:
wherein said inner cell comprises a first base station connected to a first base station controller which is served by a first mobile switching center;
wherein said airport cell comprises a second base station connected to a second base station controller which is served by a second mobile switching center;
wherein said handoff controller comprises:
data link interconnecting said first mobile switching center and said second mobile switching center for exchanging control data and communications traffic there between to effect transfer of said cellular communication services between said airport cell and said inner cell.

11. A method of operating a deck-to-deck cellular communication network for providing communication services to a plurality of wireless subscriber devices that are located in an aircraft when said aircraft is transitioning between flight modes, where said aircraft is served by at least one of a plurality of air-to-ground cells of an air-to-ground cellular network while above a predetermined altitude, and by an airport cell when said aircraft is on the ground at an airport, comprising:
providing air-to-ground cellular communication services to said aircraft exclusively from said air-to-ground cellular network via an inner cell, which is part of said air-to-ground cellular network and interposed between said at least one of said air-to-ground cells and said airport cell, when said aircraft is above said predetermined altitude from an inner cell, centered about said airport, by use of a plurality of co-spectrum air-to-ground cellular base stations each of which generates radio frequency signals on predetermined frequencies that are non-interfering with other co-spectrum air-to-ground cellular base stations comprising:
dividing said co-spectrum air-to-ground cellular base stations into two sets that are located on a circumference of a ring centered on the airport, wherein said base stations of each set of co-spectrum air-to-ground base stations are located in pairs consisting of a base station from each set and wherein said base stations of each of said pairs generates radio frequency signals on predetermined frequencies that are non-interfering with other co-spectrum air-to-ground cellular base stations and wherein each set of radio frequency signals is cross-duplexed from each other, and
providing one or more antennas located at each of said co-spectrum air-to-ground cellular base stations having closely matching antenna patterns, similar transmit power levels, compatible air interface technologies, and having elevation patterns that map to the arrival glide slope corridors of said airport; and
transferring, in response to said aircraft transitioning across said predefined altitude, said cellular communication services provided to said aircraft between said inner cell and said at least one of said air-to-ground cells, exclusively within said air-to-ground cellular network.

12. The method of operating a deck-to-deck cellular communication network of claim 11, wherein said step of providing air-to-ground cellular communication services to said aircraft comprises:
operating a plurality of co-spectrum air-to-ground cellular base stations that are positioned equidistantly from the center of said airport.

13. The method of operating a deck-to-deck cellular communication network of claim 12 wherein each of said plurality of co-spectrum air-to-ground cellular base stations are located on a ring centered on the airport, spaced equally apart around the circumference of said ring.

14. The method of operating a deck-to-deck cellular communication network of claim 12, wherein said step of providing air-to-ground cellular communication services to said aircraft further comprises:
outputting, from each of said plurality of co-spectrum air-to-ground cellular base stations, a regulated transmitted power towards the horizon by a combination of up-tilted antennas and reduced transmitter power.

15. The method of operating a deck-to-deck cellular communication network of claim 11, wherein
said co-spectrum air-to-ground cellular base stations of each of said two sets of co-spectrum air-to-ground cellular base stations are interleaved around a circumference of said ring.

16. The method of operating a deck-to-deck cellular communication network of claim 15 wherein said co-spectrum air-to-ground cellular base stations are spaced equally apart around the circumference of said ring.

17. The method of operating a deck-to-deck cellular communication network of claim 15, wherein each of said co-spectrum air-to-ground cellular base stations in said two sets of said co-spectrum air-to-ground cellular base stations outputs a regulated transmitted power towards the horizon by a combination of up-tilted antennas and reduced transmitter power.

18. The method of operating a deck-to-deck cellular communication network of claim 11 wherein said co-spectrum air-to-ground cellular base station pairs are spaced equally apart around the circumference of said ring.

19. The method of operating a deck-to-deck cellular communication network of claim 11 wherein each of said co-spectrum air-to-ground cellular base stations in said two sets of said co-spectrum air-to-ground cellular base stations generate radio-frequency signals on predetermined frequencies that are non-interfering using at least one of the interference avoidance techniques comprising: cross-polarization, partial overlap of frequency assignment, code assignment, time slot assignment, antenna pointing, and wherein each set of radio frequency signals is cross-duplexed from the other set.

20. The method of operating a deck-to-deck cellular communication network of claim 11 further comprising:
wherein said inner cell comprises a first base station connected to a first base station controller which is served by a first mobile switching center;
wherein said airport cell comprises a second base station connected to a second base station controller which is served by a second mobile switching center;
wherein said step of transferring comprises:
interconnecting said first mobile switching center and said second mobile switching center for exchanging control data and communications traffic there between to effect transfer of said cellular communication services between said airport cell and said inner cell.

* * * * *

UNITED STATES PATENT AND TRADEMARK OFFICE
CERTIFICATE OF CORRECTION

PATENT NO.       : 7,640,016 B2                         Page 1 of 1
APPLICATION NO.  : 11/240975
DATED            : December 29, 2009
INVENTOR(S)      : Cruz et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 636 days.

Signed and Sealed this

Ninth Day of November, 2010

David J. Kappos
*Director of the United States Patent and Trademark Office*